United States Patent [19]

Ritsko et al.

[11] Patent Number: 4,695,439

[45] Date of Patent: Sep. 22, 1987

[54] YTTRIUM OXIDE STABILIZED ZIRCONIUM OXIDE

[75] Inventors: Joseph E. Ritsko; David L. Houck; Howard L. R. Acla, all of Towanda, Pa.

[73] Assignee: GTE Products Corporation, Stamford, Conn.

[21] Appl. No.: 911,603

[22] Filed: Sep. 25, 1986

[51] Int. Cl.$^4$ .............................................. C01F 17/00
[52] U.S. Cl. .................................. 423/263; 423/266; 423/608
[58] Field of Search ............... 423/263, 265, 266, 608; 502/8, 9

[56] References Cited

U.S. PATENT DOCUMENTS

| | | | |
|---|---|---|---|
| 3,373,119 | 3/1968 | Krystyniak | 423/608 |
| 4,360,598 | 11/1982 | Otagiri | 423/266 |
| 4,619,817 | 10/1986 | Stambaugh et al. | 423/266 |

FOREIGN PATENT DOCUMENTS 0131774  1/1985  European Pat. Off. ............ 423/265

*Primary Examiner*—Patrick P. Garvin
*Assistant Examiner*—Paige C. Harvey
*Attorney, Agent, or Firm*—Donald R. Castle

[57] ABSTRACT

A process for forming a homogeneous mixture of yttrium oxide and zirconium oxide involves dissolving yttrium oxide and hydrochloric acid in water, precipitating yttrium hydroxide by adding ammonium hydroxide to the solution and dissolving yttrium hydroxide in acetic acid, adding zirconium oxide to the resulting solution which is thereafter spray dried to yield an agglomerate having uniformly distributed yttrium acetate throughout and thereafter converting the yttrium acetate to yttrium oxide to yield an agglomerate having uniform distribution of yttrium oxide and zirconium oxide. The yttrium oxide/zirconium oxide agglomerates have a particle size of from about 20 to about 200 microns. The intermediate agglomerate contains a uniform distribution of yttrium acetate and provides a composition which can be converted to a yttrium oxide/zirconium oxide agglomerate having a homogeneous mixture of the two components.

2 Claims, No Drawings

YTTRIUM OXIDE STABILIZED ZIRCONIUM OXIDE

FIELD OF THE INVENTION

This invention relates to yttrium oxide ($Y_2O_3$) stabilized zirconium oxide ($ZrO_2$). More particularly it relates to yttrium oxide stabilized zirconium oxide which has a homogeneous mixture of the two components.

BACKGROUND OF THE INVENTION

One method for producing yttrium oxide stabilized zirconium oxide plasma spray coatings is by plasma spraying agglomerates containing finely divided yttrium oxide ($Y_2O_3$) and finely divided zirconium oxide ($ZrO_2$). Typically from about 6% to about 20% by weight of $Y_2O_3$ is employed. To achieve stabilization it is necessary that the $Y_2O_3$ react with the $ZrO_2$ in the short time these materials are heated in the plasma spray during the coating process. If the $Y_2O_3$ particles are too large or not uniformly distributed the stabilizing reaction will be incomplete. The agglomerates are currently made by adding yttrium oxide to zirconium oxide in a water slurry with polyvinyl alcohol as a binder and spray dried. This method does not give a homogeneous mixture of the two components.

It is believed therefore that a homogeneous mixture of yttrium oxide and zirconium oxide and a process for producing same would be an advancement in the art.

SUMMARY OF THE INVENTION

In one aspect of the invention there is provided a process comprising forming a solution by mixing yttrium hydroxide and a sufficient amount of an aqueous solution of a acetic acid to dissolve the yttrium hydroxide and to yield a concentration of the solution of yttrium ion of from about 5% to about 20% by weight of this said solution. Thereafter, from about 80 to about 95 parts by weight of zirconium oxide having a particle size of from about 1 to about 5 micrometers is added to yield a slurry having a ratio of Zr:Y of about 4:1 to about 19:1. Thereafter, the slurry is spray dried to form spherical agglomerates of zirconium oxide and a relatively uniform distribution of yttrium acetate. The agglomerates have a size of from about 20 to about 200 micrometers. They are heated from about 600° C. to about 700° C. in a neutral atmosphere to convert the yttrium acetate to yttrium oxide thereby forming zirconium oxide uniformly interdispersed with about 5% to about 20% by weight of relatively finely divided yttrium oxide.

In another aspect of this invention, yttrium hydroxide is prepared by dissolving yttrium oxide in an aqueous hydrochloric acid to form a solution. Thereafter, the solution containing the yttrium is heated to about 50° C. to about 70° C. and sufficient ammonium hydroxide is added to react with at least some of the yttrium to form a yttrium hydroxide precipitate and thereafter the precipitate is washed to remove residual ammonium chloride.

In another aspect of this invention there is provided a composition consisting of essentially sphereical agglomerates having a particle size of from about 20 to about 200 micrometers and having zirconium oxide and yttrium oxide relatively homogeneously distributed throughout said agglomerates. The agglomerates have a weight ratio of yttrium oxide to zirconium oxide of from about 5:100 to about 20:100.

In another aspect of this invention there is provided a composition consisting essentially of spherical agglomerates having a particle size of from about 20 to about 200 micrometers and having zirconium oxide and yttrium acetate uniformly distributed throughout the agglomerates. The weight ratio of yttrium acetate to zirconium oxide is from about 8:100 to about 30:100.

DETAILS OF THE PREFERRED EMBODIMENTS

For a better understanding of the present invention, together with other and further objects, advantages, and capabilities thereof, reference is made to the following disclosure and appended claims in connection with the foregoing description of some other aspects of the invention.

In the practice of this invention any relatively pure yttrium hydroxide material can be utilized and is dissolved in aqueous solution of acetic acid to yield a concentration of yttrium ion in the solution of from about 5% to about 20% by weight, thereafter, zirconium oxide, which is relatively finely divided that is having a particle size from about 1 to about 5 micrometers is added in a sufficient amount to form a slurry having a weight ratio of zirconium to yttrium of from about 4:1 to about 19:1. The material is spray dried in a conventional manner and spherical agglomerates containing zirconium oxide and a relatively uniform distribution of yttrium acetate are formed. The yttrium acetate forms a binder for the individual particles of zirconium oxide. The agglomerates have a particle size of from about 20 to about 200 micrometers. These are heated in a neutral or slightly oxidizing atmosphere to a temperature range from about 600° C. to about 700° C. whereby the yttrium acetate is converted to yttrium oxide with from about 5% to about 20% by weight of finely divided yttrium oxide. The yttrium oxide is uniformly distributed throughout the agglomerate by forming a coating uniformly distributed over the individual particles of zirconium oxide.

A preferred source of the yttrium hydroxide is prepared by dissolving yttrium oxide in an aqueous solution of hydrochloric acid to form a solution. That solution is heated to about 50° C. to about 70° C. and a sufficient amount of ammonium hydroxide is added to react with a major portion of the yttrium to form a yttrium hydroxide precipitate. The precipitate is washed with water to remove any residual ammonium chloride. The washed yttrium hydroxide can be utilized as a preferred source of yttrium hydroxide in the process for producing the yttrium oxide zirconium oxide agglomerates hereinbefore described.

In order to more fully illustrate the subject invention the following detailed example is presented. All parts, proportions and percentages are by weight unless otherwise indicated.

EXAMPLE 1

About 100 parts of yttrium oxide are dissolved in concentrated hydrochloric acid and water. The solution is heated to about 50° C. to about 70° C. Ammonium hydroxide is added to yield a pH of from about 7 to 8. Yttrium hydroxide is precipitated and can be readily filtered from the warm solution, thereafter yttrium hydroxide is washed with water to remove ammonium chloride. The yttrium hydroxide in the form of a wet cake is added to about 250 parts of 17N acetic acid and heated to about 50° C. to about 70° C. thereby completely dissolving the yttrium hydroxide. To the solution of acetic acid and yttrium hydroxide about 1820 parts of zirconium oxide having a particle size of from about 1 to about 5 micrometers is added. The resulting slurry is spray dried. The spray dryer has a temperature of about 500° F. at the inlet and 300° F. to 400° F. at the outlet. The spray dryer yields spherical agglomerates that contain a uniform distribution of yttrium acetate around the individual particles of zirconium oxide. The agglomerates are heated to about 600° C. whereby the yttrium acetate converts to yttrium oxide thereby yielding an agglomerate containing zirconium oxide and yttrium oxide in which the $Y_2O_3$ is homogeneously distributed.

While there has been shown and described what are considered the preferred embodiments of the invention, it will be obvious to those skilled in the art that various changes and modifications may be made therein without departing from the scope of the invention as defined by the appended claims.

What is claimed is:

1. A process comprising:
    (a) forming a solution by mixing yttrium hydroxide and a sufficient amount of an aqueous solution of acetic acid to dissolve the yttrium hydroxide, wherein said solution has a concentration of yttrium ion of about 5% to about 20% by weight of said solution,
    (b) adding from about 80% to about 95% by weight of zirconium oxide having a particle size range from about 1 to about 5 microns to yield a Zr to Y weight ratio of from about 4:1 to about 19:1 and thereby forming a slurry,
    (c) spray drying said slurry to form spherical agglomerates consisting essentially of zirconium oxide and a relatively uniform distribution of yttrium acetate whereby said agglomerates have a size from about 20 to about 200 micrometers,
    (d) heating said agglomerates to about 600° C. to about 700° C. in a neutral or oxidizing atmosphere to convert yttrium acetate to yttrium oxide to thereby form zirconium oxide yttrium oxide agglomerates with about 5% to about 20% by weight of yttrium oxide.

2. A process according to claim 1 wherein yttrium hydroxide is prepared by
    (a) dissolving yttrium oxide in an aqueous solution of hydrochloric acid to form a solution,
    (b) heating said solution to about 50° C. to about 70° C.,
    (c) adding sufficient ammonium hydroxide to react with the yttrium to form a yttrium hydroxide precipitate, and
    (d) washing said precipitate to remove residual ammonium chloride.

* * * * *